US012623430B2

(12) United States Patent     (10) Patent No.:   US 12,623,430 B2
Dhanapal et al.     (45) Date of Patent:    May 12, 2026

(54) THERMALLY STABLE MULTILAYER PIPE

(71) Applicant: Engineered Profiles LLC, Columbus, OH (US)

(72) Inventors: Vickram Dhanapal, Delaware, OH (US); Brian Davis, Columbus, OH (US); Matthew Thomas Fenneman, Columbus, OH (US); Michael Kenneth Davis, Columbus, OH (US)

(73) Assignee: Engineered Profiles LLC, Columbus, OH (US)

( * ) Notice: Subject to any disclaimer, the term of this patent is extended or adjusted under 35 U.S.C. 154(b) by 0 days.

(21) Appl. No.: 17/737,419

(22) Filed: May 5, 2022

(65) Prior Publication Data

US 2022/0355563 A1    Nov. 10, 2022

Related U.S. Application Data

(60) Provisional application No. 63/184,303, filed on May 5, 2021.

(51) Int. Cl.
| | |
|---|---|
| *B32B 1/08* | (2006.01) |
| *B32B 27/20* | (2006.01) |
| *B32B 27/30* | (2006.01) |
| *B32B 27/36* | (2006.01) |

(Continued)

(52) U.S. Cl.
CPC ................ *B32B 1/08* (2013.01); *B32B 27/20* (2013.01); *B32B 27/304* (2013.01); *B32B 27/365* (2013.01); *C08L 27/06* (2013.01); *C08L 69/00* (2013.01); *B32B 2250/03* (2013.01);

(Continued)

(58) Field of Classification Search
CPC . B32B 1/08; B32B 2307/308; B32B 2305/30; B32B 2250/24; B32B 2250/03; B32B 27/365; B32B 27/304; B32B 27/20; C08L 69/00; C08L 27/06
See application file for complete search history.

(56) References Cited

U.S. PATENT DOCUMENTS

| | | | |
|---|---|---|---|
| 4,401,424 | A | 8/1983 | De Zen |
| 5,288,218 | A | 2/1994 | Melkonian |
| 5,629,062 | A | 5/1997 | Ejiri et al. |

(Continued)

FOREIGN PATENT DOCUMENTS

| | | | |
|---|---|---|---|
| CN | 103542186 A | 1/2014 | |
| JP | 2010254833 | * 11/2010 | ........... B29C 44/586 |

(Continued)

OTHER PUBLICATIONS

English machine translation for JP2021-028507 (Feb. 25, 2021). (Year: 2021).*

(Continued)

*Primary Examiner* — Michael C Miggins
(74) *Attorney, Agent, or Firm* — Standley Law Group LLP; Jeffrey S. Standley; Jeffrey C. Norris

(57) ABSTRACT

Multilayer pipe comprising at least a first layer and a second layer, wherein the first layer is comprised a first polymer have a first thermal stability, and the second layer is comprised of a second polymer having a second thermal stability that is improved relative to said first thermal stability. In one exemplary embodiment, the first layer is comprised of PVC or CPVC, and the second layer is comprised of polycarbonate.

14 Claims, 10 Drawing Sheets

100

102

104

(51) Int. Cl.
    *C08L 27/06*       (2006.01)
    *C08L 69/00*       (2006.01)

(52) U.S. Cl.
    CPC ....... *B32B 2250/24* (2013.01); *B32B 2305/30* (2013.01); *B32B 2307/308* (2013.01)

(56) References Cited

U.S. PATENT DOCUMENTS

| | | | | |
|---|---|---|---|---|
| 6,200,119 | B1 | 3/2001 | Pelto et al. | |
| 6,293,311 | B1 * | 9/2001 | Bushi | B29C 48/21 |
| | | | | 138/143 |
| 6,394,782 | B1 | 5/2002 | Grassi | |
| 8,517,248 | B2 | 8/2013 | Zaffino | |
| 2001/0018078 | A1 | 8/2001 | Kossl | |
| 2001/0043963 | A1 | 11/2001 | Zhang et al. | |
| 2007/0026179 | A1 | 2/2007 | de Boer et al. | |
| 2008/0132617 | A1 * | 6/2008 | Eckel | C08L 69/00 |
| | | | | 524/576 |
| 2008/0185065 | A1 | 8/2008 | Dreckotter et al. | |
| 2010/0084037 | A1 | 4/2010 | Ericsson et al. | |
| 2012/0175006 | A1 | 7/2012 | Frimel et al. | |
| 2014/0037880 | A1 | 2/2014 | Siddhamalli et al. | |
| 2014/0116563 | A1 | 5/2014 | Fernando et al. | |
| 2014/0291886 | A1 | 10/2014 | Mark et al. | |
| 2017/0036376 | A1 * | 2/2017 | Kurokawa | C08K 7/00 |
| 2017/0043518 | A1 | 2/2017 | Narayanaswamy | |
| 2017/0226355 | A1 | 8/2017 | Torfs et al. | |
| 2017/0328651 | A1 | 11/2017 | Rozga et al. | |
| 2017/0343136 | A1 | 11/2017 | Daugherty et al. | |
| 2018/0371225 | A1 * | 12/2018 | Strand | C08L 67/02 |

FOREIGN PATENT DOCUMENTS

| | | |
|---|---|---|
| JP | 2010274577 A * | 12/2010 |
| JP | 2021028507 A | 2/2021 |
| KR | 100877201 B1 | 1/2009 |
| WO | 99/61833 A1 | 12/1999 |
| WO | WO2019165539 * | 9/2019 |
| WO | WO-2020189141 A1 * | 9/2020 |

OTHER PUBLICATIONS themoldingblog.com, site visited Jun. 4, 2018, http://www.themoldingblog.com/2017/02/17/sabic-seeks-patent-for-conformal-cooling-via-additive-manufacturing/.

Hölker, R. et al., Controlling Heat Balance in a Hot Aluminum Extrusion by Additive Manufactured Extrusion Dies with Conformal Cooling Channels, International Journal of Precision Engineering and Manufacturing, Aug. 8, 2013, pp. 1487-1493, vol. 14, No. 8.

Marques, S. et al., Design of Conformal Cooling for Plastic Injection Moulding by Heat Transfer Simulation, Polimeros, 2015, pp. 564-574.

Omnexus, "HDT @0.46 Mpa (67 psi)", Heat Deflection Temperature (HDT) at 0.46 MPA (67 psi), Jan. 13, 2020, https://omnexus.specialchem.com/polymer-properties/properties/hdt-0-46-mpa-67-psi.

Harrington Industrial Plastics, Engineering Handbook For Industrial Plastic Piping Systems, pp. 4-5, http://www.hipco/wp-uploads/2019/02/Engineering-Handbook.pdf.

Professional Plastics, "Thermal Properties of Plastic Materials", http://www.professionalplastics.com/professionalplastics/ThermalPropertiesofPlasticMaterials.pdf, pp. 1-4, USA.

* cited by examiner

| SAMPLE | OUTER CORE POLYMER | INNER CORE POLYMER | GLASS % | INNER CORE THICKNESS | TOTAL THICKNESS | ACTUAL INNER CORE THICKNESS | ACTUAL TOTAL THICKNESS | THERMAL SHRINKAGE AT 230°F | CLTE | ADHESION | HDT°C |
|---|---|---|---|---|---|---|---|---|---|---|---|
| 1 | PVC | PC | 9% | 0.015 | 0.06 | 0.01610 | 0.06490 | -0.10% | 3.36 | 491 | 73.2 |
| 2 | PVC | PC | 9% | 0.020 | 0.06 | 0.02135 | 0.06400 | -0.08% | 3.15 | 467 | 73.9 |
| 3 | PVC | PC | 9% | 0.030 | 0.06 | 0.03050 | 0.06470 | -0.08% | 3.05 | 451 | 77.8 |
| 4 | PVC | PC | 20% | 0.015 | 0.06 | 0.01635 | 0.05935 | -0.07% | 2.85 | 456 | 73.8 |
| 5 | PVC | PC | 20% | 0.020 | 0.06 | 0.02120 | 0.06285 | -0.07% | 2.60 | 399 | 74.6 |
| 6 | PVC | PC | 20% | 0.030 | 0.06 | 0.02945 | 0.06315 | -0.05% | 2.51 | 381 | 90.9 |
| 7 | PVC | PC | 30% | 0.015 | 0.06 | 0.01485 | 0.06080 | -0.07% | 2.68 | 431 | 74.3 |
| 8 | PVC | PC | 30% | 0.020 | 0.06 | 0.02120 | 0.06220 | -0.07% | 2.31 | 419 | 75.4 |
| 9 | PVC | PC | 30% | 0.030 | 0.06 | 0.02885 | 0.06745 | -0.09% | 2.23 | 547 | 80.6 |
| 10 | PVC | PC | 0% | 0.015 | 0.06 | 0.01460 | 0.06380 | -0.35% | 3.73 | 599 | 63.4 |

FROM FIG. 2

| | | | | | | | | | | | |
|---|---|---|---|---|---|---|---|---|---|---|---|
| 11 | PVC | PC | 0% | 0.020 | 0.06 | 0.02100 | 0.06325 | -0.29% | 3.52 | 560 | 69.1 |
| 12 | PVC | PC | 0% | 0.030 | 0.06 | 0.03225 | 0.06700 | -0.06% | 3.42 | 385 | 69.8 |
| 13 | CPVC | PC | 0% | 0.015 | 0.06 | 0.01400 | 0.06315 | -0.30% | 4.06 | 654 | 84.9 |
| 14 | CPVC | PC | 0% | 0.020 | 0.06 | 0.02065 | 0.06050 | -0.23% | 3.97 | 564 | 92.7 |
| 15 | CPVC | PC | 0% | 0.030 | 0.06 | 0.02800 | 0.06245 | -0.22% | 3.84 | 570 | 106 |
| 16 | CPVC | PC | 20% | 0.015 | 0.06 | 0.01485 | 0.06405 | -0.07% | 2.98 | 453 | 109 |
| 17 | CPVC | PC | 20% | 0.020 | 0.06 | 0.02120 | 0.06345 | -0.07% | 2.64 | 420 | 111 |
| 18 | CPVC | PC | 20% | 0.030 | 0.06 | 0.02840 | 0.06135 | -0.04% | 2.31 | 426 | 122 |
| 19 | CPVC | NA | NA | NA | 0.06 | NA | 0.06175 | -0.31% | 4.02 | 0 | 77.4 |
| 20 | PVC | PC | 20% | 0.020 | 0.06 | 0.01985 | 0.06385 | -0.08% | 2.63 | 543 | 74.1 |
| 21 | PVC | PC | 20% | 0.020 | 0.06 | 0.02090 | 0.06250 | -0.07% | 2.56 | 465 | 78.7 |
| 22 | PVC | PC | 20% | 0.020 | 0.06 | 0.02115 | 0.06365 | -0.07% | 2.58 | 419 | 79.3 |

FIG. 2 (cont.)

| SAMPLE # | OUTER CORE | INNER CORE | GLASS % | COEx10E(-5)in/inF |
|----------|------------|------------|---------|-------------------|
| #1 | PVC | PC | 9.0% | 3.365 |
| #2 | PVC | PC | 9.0% | 3.150 |
| #3 | PVC | PC | 9.0% | 3.052 |
| #4 | PVC | PC | 20.0% | 2.847 |
| #5 | PVC | PC | 20.0% | 2.598 |
| #6 | PVC | PC | 20.0% | 2.514 |
| #7 | PVC | PC | 30.0% | 2.679 |
| #8 | PVC | PC | 30.0% | 2.306 |
| #9 | PVC | PC | 30.0% | 2.234 |
| #10 | PVC | PC | 0.0% | 3.730 |
| #11 | PVC | PC | 0.0% | 3.519 |
| #12 | PVC | PC | 0.0% | 3.418 |
| #13 | CPVC | PC | 0.0% | 4.062 |
| #14 | CPVC | PC | 0.0% | 3.975 |
| #15 | CPVC | PC | 0.0% | 3.844 |
| #16 | CPVC | PC | 20.0% | 2.982 |
| #17 | CPVC | PC | 20.0% | 2.640 |
| #18 | CPVC | PC | 20.0% | 2.314 |
| #19 | CPVC | NA | NA | 4.023 |
| #20 | PVC | PC | 20.0% | 2.633 |
| #21 | PVC | PC | 20.0% | 2.557 |
| #22 | PVC | PC | 20.0% | 2.576 |

FIG. 3

| SAMPLE % | OUTER CORE | INNER CORE | GLASS % | INNER CORE THICKNESS | 230° OVEN | START | CYCLE #1 | % SHRINKAGE |
|---|---|---|---|---|---|---|---|---|
| #1 | PVC | PC | 9.0% | 0.015 | FULL THERMAL CYCLE | 12.143 | 12.131 | -0.10% |
| #2 | PVC | PC | 9.0% | 0.020 | FULL THERMAL CYCLE | 12.133 | 12.123 | -0.08% |
| #3 | PVC | PC | 9.0% | 0.030 | FULL THERMAL CYCLE | 12.255 | 12.245 | -0.08% |
| #4 | PVC | PC | 20.0% | 0.015 | FULL THERMAL CYCLE | 12.134 | 12.126 | -0.07% |
| #5 | PVC | PC | 20.0% | 0.020 | FULL THERMAL CYCLE | 12.137 | 12.128 | -0.07% |
| #6 | PVC | PC | 20.0% | 0.030 | FULL THERMAL CYCLE | 12.139 | 12.133 | -0.05% |
| #7 | PVC | PC | 30.0% | 0.015 | FULL THERMAL CYCLE | 12.124 | 12.115 | -0.07% |
| #8 | PVC | PC | 30.0% | 0.020 | FULL THERMAL CYCLE | 12.128 | 12.120 | -0.07% |
| #9 | PVC | PC | 30.0% | 0.030 | FULL THERMAL CYCLE | 12.112 | 12.101 | -0.09% |
| #10 | PVC | PC | 0.0% | 0.015 | FULL THERMAL CYCLE | 12.121 | 12.079 | -0.35% |

FROM FIG. 4

| | | | | | | | | |
|---|---|---|---|---|---|---|---|---|
| #11 | PVC | PC | 0.0% | 0.020 | FULL THERMAL CYCLE | 12.129 | 12.094 | -0.29% |
| #12 | PVC | PC | 0.0% | 0.030 | FULL THERMAL CYCLE | 12.129 | 12.122 | -0.06% |
| #13 | CPVC | PC | 0.0% | 0.015 | FULL THERMAL CYCLE | 12.124 | 12.088 | -0.30% |
| #14 | CPVC | PC | 0.0% | 0.020 | FULL THERMAL CYCLE | 12.125 | 12.097 | -0.23% |
| #15 | CPVC | PC | 0.0% | 0.030 | FULL THERMAL CYCLE | 12.119 | 12.092 | -0.22% |
| #16 | CPVC | PC | 20.0% | 0.015 | FULL THERMAL CYCLE | 12.128 | 12.119 | -0.07% |
| #17 | CPVC | PC | 20.0% | 0.020 | FULL THERMAL CYCLE | 12.126 | 12.118 | -0.07% |
| #18 | CPVC | PC | 20.0% | 0.030 | FULL THERMAL CYCLE | 12.123 | 12.118 | -0.04% |
| #19 | CPVC | NA | NA | NA | FULL THERMAL CYCLE | 12.116 | 12.079 | -0.31% |
| #20 | PVC | PC | 20.0% | 0.020 | FULL THERMAL CYCLE | 12.124 | 12.114 | -0.08% |
| #21 | PVC | PC | 20.0% | 0.020 | FULL THERMAL CYCLE | 12.124 | 12.115 | -0.07% |
| #22 | PVC | PC | 20.0% | 0.020 | FULL THERMAL CYCLE | 12.130 | 12.121 | -0.07% |

FIG. 4 (cont.)

| 0.030" HOLE SAW DEPTH | | Y | ADHESION FAILURE (FAILED AT DOLLY SURFACE) | | | | | | 450 PSI MIN | A = CAP |
| DOLLY SIZE 14 | | A/B/C/D | COHESIVE FAILURE (FAILED IN PROFILE, BETWEEN LAYERS) | | | | | | 350 PSI MIN | B = PVC |
| RATE 300 PSI/SEC | | N | NO FAILURE (PVC TEAR) | | | | | | 350 PSI MIN | C = CORE |
| | | | 1 | | 2 | | 3 | | 4 | D = PVC |

| OUTER CORE | INNER CORE | GLASS % | INNER CORE THICKNESS | ITEM % | AVE PSI | PK PSI | DELAM | PK PSI | DELAM | PK PSI | DELAM | PK PSI | DELAM |
|---|---|---|---|---|---|---|---|---|---|---|---|---|---|
| PVC | PC | 9.0% | 0.015 | #1 | 491 | 498 | C-D | 482 | C-D | 494 | C-D | REPEAT | |
| PVC | PC | 9.0% | 0.020 | #2 | 467 | 492 | C-D | 419 | C-D | 490 | C-D | REPEAT | |
| PVC | PC | 9.0% | 0.030 | #3 | 451 | 426 | C-D | 467 | C-D | 460 | C-D | REPEAT | |
| PVC | PC | 20.0% | 0.015 | #4 | 456 | 492 | A | 429 | C-D | 446 | C-D | REPEAT | |
| PVC | PC | 20.0% | 0.020 | #5 | 395 | 397 | C-D | 396 | C-D | 404 | C-D | REPEAT | |

FROM FIG. 5

| | | | | | | | | | | | | |
|---|---|---|---|---|---|---|---|---|---|---|---|---|
| PVC | PC | 20.0% | 0.030 | #6 | 381 | 387 | C-D | 388 | C-D | 367 | C-D | REPEAT |
| PVC | PC | 30.0% | 0.015 | #7 | 491 | 439 | C-D | 423 | C-D | 430 | C-D | |
| PVC | PC | 30.0% | 0.020 | #8 | 419 | 421 | C-D | 418 | C-D | 418 | C-D | |
| PVC | PC | 30.0% | 0.030 | #9 | 547 | 553 | Y | 551 | N | 537 | N | |
| PVC | PC | 0.0% | 0.015 | #10 | 595 | 595 | N | 630 | N | 573 | N | |
| PVC | PC | 0.0% | 0.020 | #11 | 560 | 564 | N | 559 | N | 556 | N | |
| PVC | PC | 0.0% | 0.030 | #12 | 385 | 383 | C-D | 392 | C-D | 379 | C-D | |
| CPVC | PC | 0.0% | 0.015 | #13 | 654 | 676 | N | 611 | A | 676 | N | |
| CPVC | PC | 0.0% | 0.020 | #14 | 564 | 564 | N | 519 | N | 608 | N | |
| CPVC | PC | 0.0% | 0.030 | #15 | 570 | 503 | N | 612 | N | 595 | N | |
| CPVC | PC | 20.0% | 0.015 | #16 | 455 | 440 | N | 455 | N | 464 | N | |
| CPVC | PC | 20.0% | 0.020 | #17 | 420 | 416 | N | 425 | N | 418 | N | |

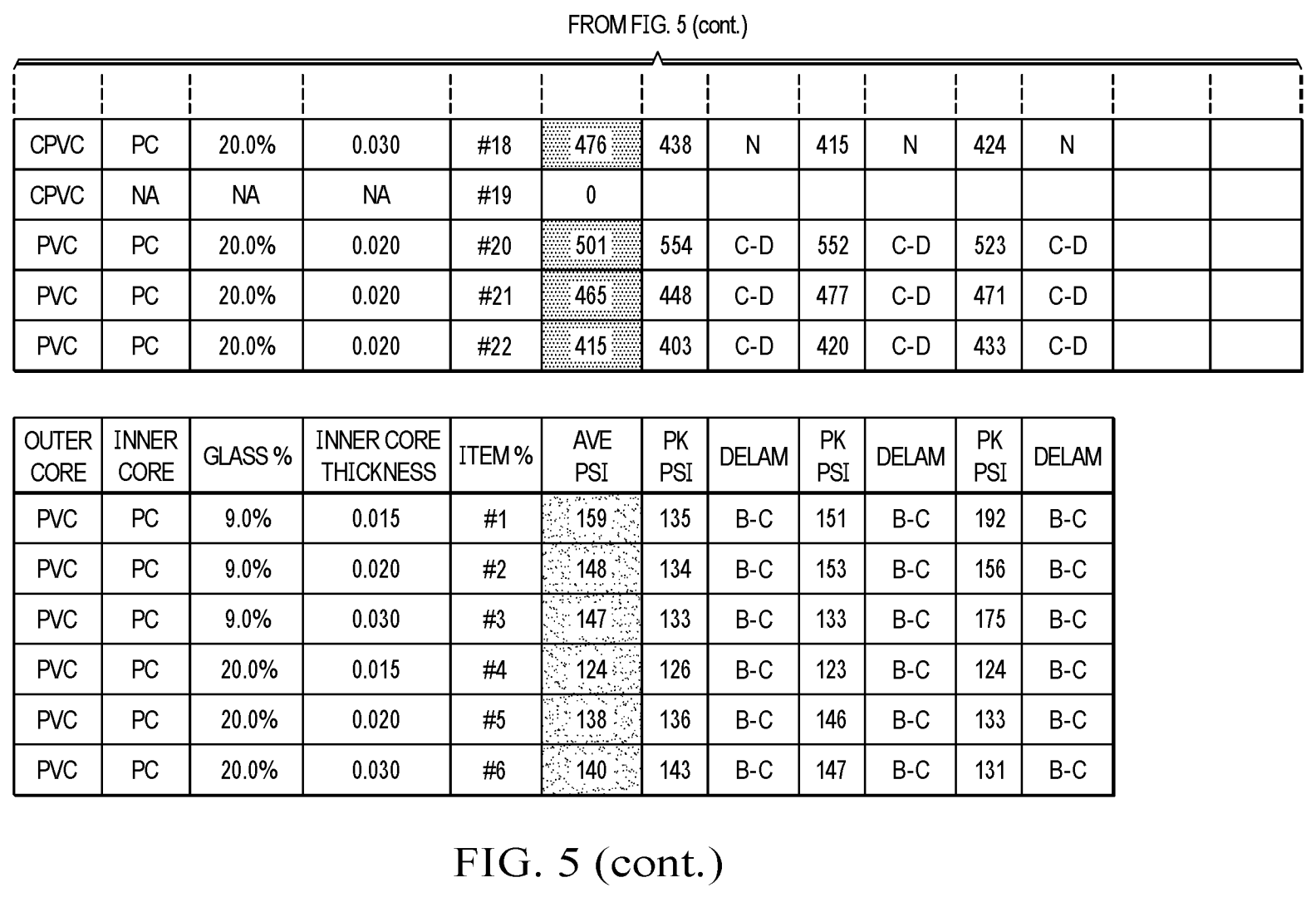

FROM FIG. 5 (cont.)

| OUTER CORE | INNER CORE | GLASS % | INNER CORE THICKNESS | ITEM | AVE PSI | PK PSI | DELAM | PK PSI | DELAM | PK PSI | DELAM |
|---|---|---|---|---|---|---|---|---|---|---|---|
| CPVC | PC | 20.0% | 0.030 | #18 | 476 | 438 | N | 415 | N | 424 | N |
| CPVC | NA | NA | NA | #19 | 0 | | | | | | |
| PVC | PC | 20.0% | 0.020 | #20 | 501 | 554 | C-D | 552 | C-D | 523 | C-D |
| PVC | PC | 20.0% | 0.020 | #21 | 465 | 448 | C-D | 477 | C-D | 471 | C-D |
| PVC | PC | 20.0% | 0.020 | #22 | 415 | 403 | C-D | 420 | C-D | 433 | C-D |

| OUTER CORE | INNER CORE | GLASS % | INNER CORE THICKNESS | ITEM% | AVE PSI | PK PSI | DELAM | PK PSI | DELAM | PK PSI | DELAM |
|---|---|---|---|---|---|---|---|---|---|---|---|
| PVC | PC | 9.0% | 0.015 | #1 | 159 | 135 | B-C | 151 | B-C | 192 | B-C |
| PVC | PC | 9.0% | 0.020 | #2 | 148 | 134 | B-C | 153 | B-C | 156 | B-C |
| PVC | PC | 9.0% | 0.030 | #3 | 147 | 133 | B-C | 133 | B-C | 175 | B-C |
| PVC | PC | 20.0% | 0.015 | #4 | 124 | 126 | B-C | 123 | B-C | 124 | B-C |
| PVC | PC | 20.0% | 0.020 | #5 | 138 | 136 | B-C | 146 | B-C | 133 | B-C |
| PVC | PC | 20.0% | 0.030 | #6 | 140 | 143 | B-C | 147 | B-C | 131 | B-C |

FIG. 5 (cont.)

THERMALLY STABLE MULTILAYER PIPE

This application claims the priority benefit of U.S. Provisional Application No. 63/184,303, filed May 5, 2021, which is hereby incorporated in its entirety.

BACKGROUND AND SUMMARY OF THE INVENTION

Exemplary embodiments of the present invention relate generally to pipe.

Plastic pipe is commonly made of polyvinyl chloride (PVC) or chlorinated polyvinyl chloride (CPVC). PVC or CPVC may provide beneficial properties for pipe such as resistance to corrosion and degradation. Both materials also offer good resistance to heat. In particular, PVC may have a max functional temperature of about 140° Fahrenheit, and CPVC may have a max functional temperature of about 200° Fahrenheit. However, both PVC and CPVC are expensive, and the price of CPVC is typically much higher than for PVC. Therefore, there is a need for a cost-effective substitute for PVC and CPVC, particularly for plastic pipe, while also providing improved or similar thermal stability relative to PVC and CPVC, particularly as used for traditional plastic pipe.

Other types of pipe may be comprised of polyethylene, polypropylene, or other polymers. These other polymers may also be expensive and/or lack in thermal stability. As such, there is also a need for a cost-effective substitute for any of these polymers, while also providing improved or similar thermal stability relative to those polymers.

An exemplary embodiment may address some or all of the shortcomings of the known art. In an exemplary embodiment, a pipe comprises at least a first layer and a second layer, wherein the first layer is comprised a first polymer have a first thermal stability, and the second layer is comprised of a second polymer having a second thermal stability that is improved relative to said first thermal stability.

In at least one exemplary embodiment, at least a first layer may comprise PVC, CPVC, acrylonitrile butadiene styrene (ABS), polyethylene, polypropylene, or other similar or suitable material. The second layer may comprise polycarbonate, acrylic, acrylonitrile styrene acrylate, acrylonitrile butadiene acrylate, ABS, CPVC, nylon, or other similar or suitable material having improved thermal stability relative to the polymer of the first layer. Some exemplary embodiments may also comprise at least a third layer. For instance, by way of example, one particularly useful embodiment may comprise PVC or CPVC as an outer layer, polycarbonate as a middle layer, and PVC or CPVC as an inner layer. In one example, an embodiment may provide improved thermal stability characteristics compared to an otherwise similar component comprising only the aforementioned first layer and/or compared to an otherwise similar traditional component that does not have the aforementioned second layer. In another example, an embodiment may provide the same, similar, or improved thermal stability characteristics at a reduced cost compared to an otherwise similar component comprising only the aforementioned first layer and/or compared to an otherwise similar traditional component that does not have the aforementioned second layer.

In one exemplary embodiment, a plastic pipe comprises at least one layer (preferably an outer layer) comprised of PVC or CPVC, and at least one layer (preferably an intermediate or inner layer) comprised of polycarbonate. While plastic pipe is commonly made of PVC or CPVC, other exemplary embodiments of the present invention may have at least one layer (preferably an outer layer) comprised of polyethylene or polypropylene, and at least one layer (preferably an intermediate or inner layer) comprised of nylon. In any of these embodiments, the resulting plastic pipe may have improved thermal stability characteristics, or the same, similar, or improved thermal stability characteristics at a reduced cost, compared to an otherwise similar component comprised only of PVC, CPVC, polyethylene, or polypropylene.

In an exemplary embodiment, the first, second, and/or any additional layer may have at least one additional filler, additive, or doping material mixed in with the polymeric material. Some types of filler material include, but are not limited to, glass, talc, fibrous material, chemicals, metals, other mineral fillers, and other organic or inorganic materials. Other materials or material layers may be used if desired and compatible with at least one of the aforementioned layers.

The filler, additive or doping materials may be of any material that is compatible with the material of the layer in which the filler is placed. Additionally, users may choose which filler, additive or doping materials to use based on the properties that will be enhanced or added to the final material. One or more filler material may be used.

In particular, it may be desired that additives, fillers, or doping materials selected be useful in improving (or at least not diminishing) the thermal stability of a pipe. Thermal stability is a substance's resistance to permanent property changes caused solely by heat. Heat distortion temperature (HDT), coefficient of linear thermal expansion (CLTE), and shrinkage are some of the commonly used metrics to assess thermal stability. Regarding "improve" or the like as used herein, an exemplary embodiment of the present invention may improve any of the aforementioned or other aspects of thermal stability.

Additionally, an exemplary embodiment of the final material may have improved heat deflection, improved thermal movement, improved surface finish, or improved impact resistance. An exemplary embodiment of the final material may also be able to provide better structural stability, be produced at a lower cost, or provide improved physical, electrical, or other characteristics as needed.

In addition to the novel features and advantages mentioned above, other benefits will be readily apparent from the following descriptions of the drawings and exemplary embodiments.

BRIEF DESCRIPTION OF THE DRAWINGS

FIG. 2 is an exemplary chart of coefficient of linear thermal expansion and shrinkage (among other characteristics) for various examples of multilayer pipe comprising a PVC or CPVC layer and a polycarbonate layer. For comparison, a sample 19 is also shown for a traditional CPVC pipe.

FIG. 3 is an exemplary chart of coefficient of linear thermal expansion for the various examples of FIG. 2.

FIG. 4 is an exemplary chart of shrinkage for the various examples of FIG. 2.

FIG. 5 is an exemplary chart related to adhesion between the layers for the various examples of FIG. 2.

DETAILED DESCRIPTION OF EXEMPLARY
EMBODIMENT(S)

This disclosure describes exemplary embodiments of a
pipe that may be made by an extrusion or co-extrusion
process, wherein the pipe may have improved thermal
stability. Additionally, depending on the materials and fillers
used, the pipe may have improved mechanical, chemical,
electrical or other properties. A combination of materials
may be used to achieve the desired properties. For example,
a combination of materials may be chosen to reduce cost,
while increasing thermal stability and other properties and
also giving the pipe a high-quality appearance.

A pipe may comprise at least two layers of different
polymeric materials, wherein fillers, additives, or doping
materials may be included in the respective polymeric
materials. A pipe may typically be made by a known
extrusion or coextrusion process. However, other suitable
manufacturing processes may be employed.

Various combinations of materials may be chosen depend-
ing on the conditions the pipe is required to withstand, and
the mechanical, thermal, chemical or other properties a pipe
is required to have. For example, a pressurized application,
which may experience high heat, may require certain mate-
rials that have sufficient thermal stability, whereas non-
pressurized applications may be open to the use of a wider
range of materials.

Figure 1:
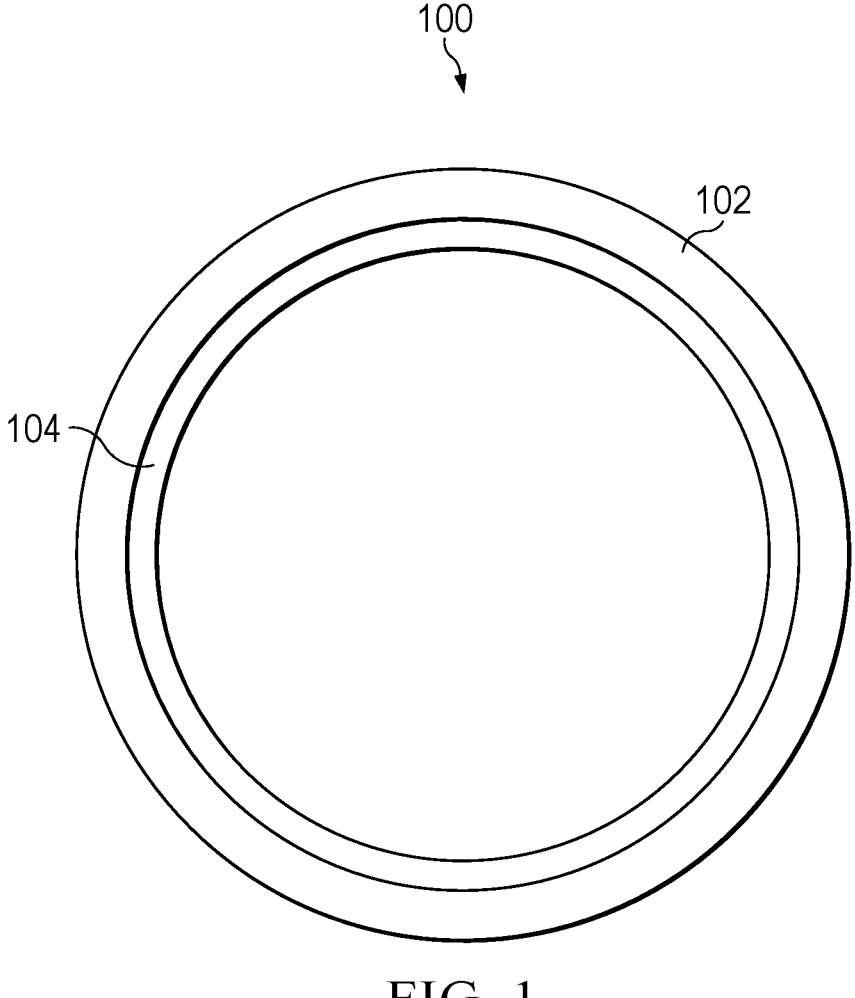
FIG. 1 is a side elevation view of an exemplary embodiment of a pipe of the present invention.

FIG. 1 shows an exemplary embodiment of a pipe of the
present invention, wherein any of the aforementioned con-
siderations may apply. In this exemplary embodiment, pipe
100 comprises at least one layer (preferably an outer layer
102) comprised of a polymer having a first or base thermal
stability, and at least one layer (preferably an inner layer
104) comprised of another polymer having a thermal sta-
bility that is improved relative to the thermal stability of the
polymer of the first layer. For instance, as a substitute for a
traditional PVC or CPVC pipe, pipe 100 may comprise at
least one layer (preferably outer layer 102) comprised of
PVC or CPVC, and at least one layer (preferably an inner
layer 104) comprised of polycarbonate. As one alternative or
in addition to PVC or CPVC, other exemplary embodiments
of the present invention may have at least one layer (pref-
erably an outer layer) comprised of polyethylene or poly-
propylene, and at least one layer (preferably an inner layer)
comprised of polycarbonate. However, in other exemplary
embodiments, PVC, CPVC, polyethylene, or polypropylene
may form an intermediate or inner layer, and/or polycarbon-
ate may form an intermediate or outer layer. Some exem-
plary embodiments may also comprise other material layers
as needed or desired for particular applications. In all such
exemplary embodiments, a pipe may have improved thermal
stability characteristics, or the same, similar, or improved
thermal stability characteristics at a reduced cost, compared
to an otherwise similar pipe comprised only of PVC, CPVC,
polyethylene, or polypropylene.

In some exemplary embodiments of pipe 100, the inven-
tors have discovered that inner layer 104 may comprise glass
filler in an amount up to about 35 wt. % of the inner layer
104, more preferably between about 9 wt. % and 30 wt. %
of the inner layer 104. Glass filler may further enhance
thermal stability and also help to further reduce cost. How-
ever, as with previous embodiments herein, outer layer 102
(or additional layers in other embodiments) may comprise
glass filler in addition to, or as an alternative to, inner layer
104. Furthermore, other fillers, additives, or doping materi-
als may be used that are designed to further improve the
thermal, electrical, chemical, or other properties of the pipe 100. In addition to glass filler, a user may select other
appropriate filler, additive, or doping material and the con-
centration of that material based on the desired properties of
the pipe 100. The amount, and type, of filler added will
depend on the physical or other properties that may be given
to the pipe 100.

FIGS. 2-6 address 21 different examples of pipe 100
having a polycarbonate inner layer 104. In samples or items
1-12 and 20-22, the outer core polymer is PVC. In samples
or items 13-18, the outer core polymer is CPVC. Sample or
item 19 in FIGS. 2-6 address a traditional CPVC pipe for
comparison purposes. In each of these exemplary embodi-
ments, pipe 100 has an overall thickness of about 0.060
inches, and the inner layer 104 is about 0.015 inches to 0.030
inches thick. Other exemplary embodiments may have other
overall thicknesses, as well as inner, outer, and/or other
layers having other thicknesses, such as may be needed or
beneficial for particular uses.

The CPVC comparison sample or item 19 has a thermal
shrinkage of 0.31% at 230° Fahrenheit and a coefficient of
linear thermal expansion (CLTE) of about $4.02 \times 10^{-5}$ in/in-°
F. In samples or items 10-12 having no glass filler, the PVC
embodiments have a similar or improved thermal shrinkage
between about 0.06% and 0.35% at 230° Fahrenheit and an
improved CLTE between about $3.42 \times 10^{-5}$ in/in-° F. and
$3.73 \times 10^{-5}$ in/in-° F., all at a substantial reduced cost relative
to a traditional CPVC pipe. Similarly, in samples or items
13-15 having no glass filler, the CPVC embodiments have a
similar or improved thermal shrinkage between about 0.22%
and 0.30% at 230° Fahrenheit and a similar or improved
CLTE between about $3.84 \times 10^{-5}$ in/in-° F. and $4.06 \times 10^{-5}$
in/in-° F., again at a substantial reduced cost relative to a
traditional CPVC pipe.

The inventors have discovered that the addition of glass
filler may further improve thermal shrinkage and CLTE in
comparison to a traditional CPVC pipe (and traditional PVC
pipe, by extension), all while providing a significant cost
reduction. In samples or items 1-3 having 9 wt. % glass filler
in the polycarbonate layer 104, the PVC embodiments have
a much-improved thermal shrinkage between about 0.08%
and 0.10% at 230° Fahrenheit and a much-improved CLTE
between about $3.05 \times 10^{-5}$ in/in-° F. and $3.36 \times 10^{-5}$ in/in-° F.
In samples or items 4-6 having 20 wt. % glass filler in the
polycarbonate layer 104, the PVC embodiments have a
greatly improved thermal shrinkage between about 0.05%
and 0.07% at 230° Fahrenheit and a greatly improved CLTE
between about $2.51 \times 10^{-5}$ in/in-° F. and $2.85 \times 10^{-5}$ in/in-° F.
In addition, in samples or items 20-22 having 20 wt. % glass
filler in the polycarbonate layer 104, the PVC embodiments
have a greatly improved thermal shrinkage between about
0.07% and 0.08% at 230° Fahrenheit and a greatly improved
CLTE between about $2.56 \times 10^{-5}$ in/in-° F. and $2.63 \times 10^{-5}$
in/in-° F. Moreover, in samples or items 16-18 having 20 wt.
% glass filler in the polycarbonate layer 104, the CPVC
embodiments have an even more significantly improved
thermal shrinkage between about 0.04% and 0.07% at 230°
Fahrenheit and an even more significantly improved CLTE
between about $2.31 \times 10^{-5}$ in/in-° F. and $2.98 \times 10^{-5}$ in/in-° F.
Likewise, substantial improvements are seen when the
amount of glass filler in polycarbonate layer 104 is increased
to 30 wt. %. Indeed, in samples or items 7-9, such PVC
embodiments have an improved thermal shrinkage between
about 0.07% and 0.09% at 230° Fahrenheit and an even
further improved CLTE between about $2.23 \times 10^{-5}$ in/in-° F.
and $2.68 \times 10^{-5}$ in/in-° F. Based on the foregoing examples,
it is expected that similar benefits will be available for
different amounts of glass filler content up to about 35 wt.

% for embodiments having a PVC or CPVC outer layer, as well as for embodiments that have a polyethylene or polypropylene outer layer relative to a traditional polyethylene or polypropylene pipe, respectively. Furthermore, significant improvements in heat distortion temperature (HDT) may be achieved (e.g., samples 13-18 in FIG. 2).

Figure 6:
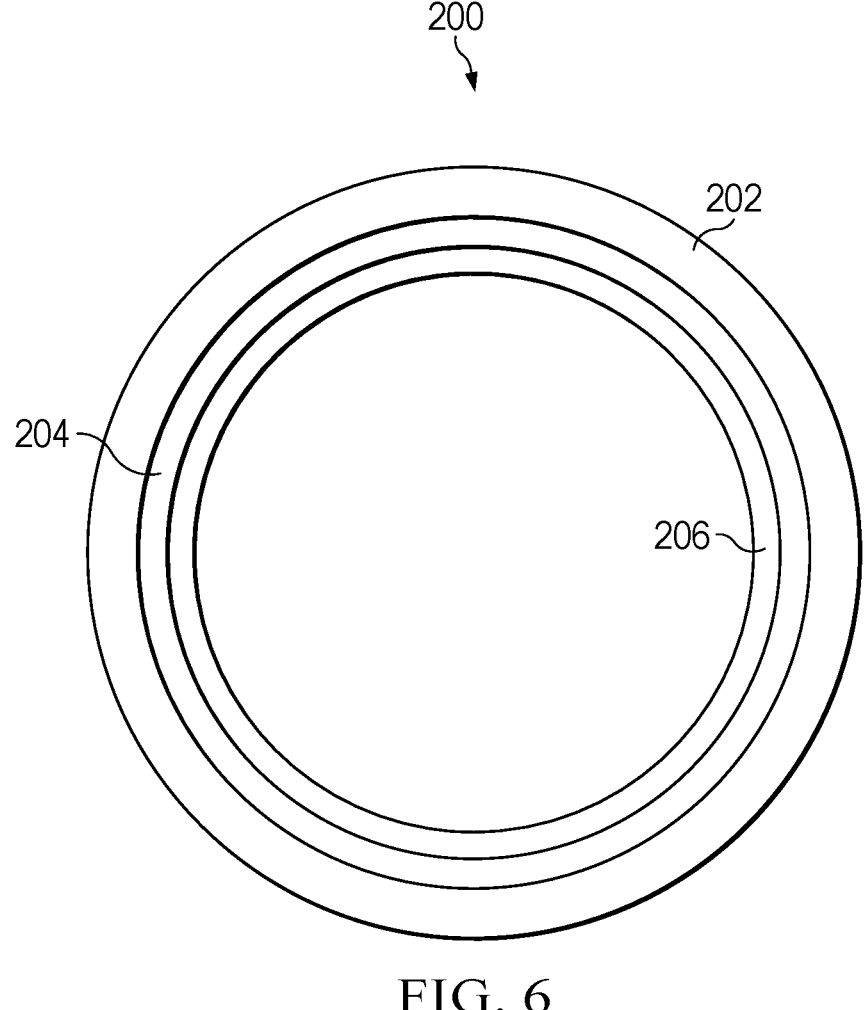
FIG. 6 is a side elevation view of an exemplary embodiment of a pipe of the present invention.

FIG. 6 illustrates an example of a pipe having at least one additional layer. This exemplary embodiment of a pipe may be similar to the example of pipe 100, except with the addition of at least one other layer. For example, certain standards or regulations may only allow for certain pre-approved materials to serve as an innermost layer of a pipe. In that instance, at least one additional layer may be positioned inwardly of the aforementioned second layer in order to be in contact with any fluid that may flow through the pipe. Other examples may also have at least additional layer positioned outwardly of the aforementioned first layer, or between the aforementioned first and second layers. Also, as aforementioned, the layers may be otherwise rearranged in other exemplary embodiments as needed or desirable for certain applications.

In the example of FIG. 6, pipe 200 is comprised of a first polymer layer 202 having a first thermal stability, a second polymer layer 204 having a second thermal stability that is improved relative to the first thermal stability, and a third polymer layer 206 having a thermal stability that is between the first thermal stability and the second thermal stability. In this exemplary embodiment, the first layer 202 may be comprised of PVC or CPVC, and the second layer 204 may be comprised of polycarbonate. Furthermore, in this exemplary embodiment, the third layer 206 may be an innermost layer that is comprised of the same polymer as the first layer. However, other exemplary embodiments may have a third layer that is comprised of a different polymer than the first layer, and/or may be positioned elsewhere relative to the aforementioned first layer and second layer, such as may be needed or desirable for certain applications.

Other exemplary embodiments may be comprised of other polymers that are suitable for an application. The aforementioned examples may be particularly useful for pressurized applications (e.g., involving high heat), while also still being useful for non-pressurized applications. Other polymers may be suitable for other applications (e.g., non-pressurized applications). For instance, some other exemplary embodiments may have a first layer comprised of PVC, CPVC, ABS, polyethylene, or polypropylene, and a second layer comprised of polycarbonate or ABS. Furthermore, other exemplary embodiments may have at least one additional layer comprised of PVC, CPVC, ABS, polyethylene, polypropylene, or another polymer having a thermal stability between that of a first polymer and a second polymer. Finally, other exemplary embodiments may include other additives and fillers in any of the layers, such as may be suitable or desirable for any application.

The foregoing examples describe some possible substitutes for some traditional types of pipe. Based on the foregoing principles, other variations are possible to improve the thermal stability of a pipe and/or reduce the cost of a pipe. In an exemplary embodiment, the first layer may be a polymer, co-polymer, or other material having the desired characteristics. The first layer may be any material that is chemically compatible with or otherwise connectable to (e.g., a tie layer may be used) the polymeric material of a second layer. In an exemplary embodiment, the material in the first layer may be comprised of PVC, CPVC, ABS, high-density polyethylene (HDPE), low-density polyethylene (LDPE), polypropylene, or other similar or suitable materials.

In another exemplary embodiment of a pipe having an overall thickness of 0.040 to 0.060 inches, the first layer may be 0.001 inches to 0.050 inches thick. More preferably, in such an embodiment, the first layer may be 0.005 inches to 0.030 inches thick, and still more preferably the first layer may be 0.015 inches to 0.025 inches thick. In yet another exemplary embodiment having an overall thickness of 0.5 inches, the first layer may be 0.002 inches to 0.200 inches thick. Other exemplary embodiments may have other overall thicknesses, as well as first layers having other overall thicknesses, such as may be needed or beneficial for a particular pipe.

The second layer may be a polymer, co-polymer, or other material that is chemically compatible with or otherwise connectable to the first layer. Additionally, the material of the second layer may include a filler, additive or doping material to create a composite material. In an exemplary embodiment, a main component of the second layer may typically be polycarbonate (PC), acrylic, acrylonitrile styrene acrylate (ASA), acrylonitrile butadiene acrylate (ABA), acrylonitrile butadiene styrene (ABS), CPVC, nylon, or other similar or suitable material.

While some examples of materials are mentioned above for the different layers, many other types of the materials may be implemented in various other embodiments. For example, standard plastics, engineering plastics, advanced engineering materials, and imidized materials may be used for any layer, which may be amorphous or crystalline materials, wherein the materials of adjacent layers may or may not be compatible. For instance, in the event of incompatible layers, a tie layer may be used to bond the adjacent layers together. In the progression from standard plastics, engineering plastics, advanced engineering materials, to imidized materials, the characteristics of the materials may generally transition from being: 1) general purpose, lower stress tolerance, good bonding, and good formability; 2) engineering or structural grade and good wear resistance; to 3) higher temperature resistance, higher steam resistance, higher wear resistance, and higher chemical resistance. Examples of standard plastics include, but are not limited to, polystyrene (PS), acrylonitrile butadiene styrene (ABS), PVC, CPVC, polypropylene (PP), HDPE, and low-density polyethylene (LDPE). Examples of engineering plastics include, but are not limited to, polyphenylene oxide (PPO), acrylic, PC, acetal, polyoxymethylene (POM), polyethylene terephthalate (PTEP), ultra-high molecular weight polyethylene (UHMW PE), nylon, and polyamide (PA). Example of advanced engineering materials include, but are not limited to, polysulfone (PSU), polyphenylsulfone (PPSU), polyetherimide (PEI), polyphenylene sulfide (PPS), polyetheretherketone (PEEK), and polytetrafluoroethylene (PTFE). Lastly, examples of imidized materials include, but are not limited to, polyimide (PI), polybenzimidazole (PBI), and polyamide-imide (PAI). The particular materials used for each layer of a multilayer pipe may be selected to achieve the desired physical characteristics (e.g., thermal stability). However, other factors may also factor into a selection of materials, such as material availability, material costs, manufacturability, etc.

As stated above, the first or second layer (or additional layers in other embodiments) may contain a filler, additive, or doping material that is designed to improve the thermal, electrical, chemical or other properties of a pipe. A user may select the appropriate filler, additive or doping material and the concentration of that material based on the desired properties of the final pipe. The amount, and type, of filler added may depend on the physical or other properties that may be given to a pipe. In one exemplary embodiment, the filler may be added in an amount from 10 wt. % to 45 wt. % of the weight of the second layer, and more preferably the amount of filler added may be in the amount of between 30 wt. % and 40 wt. % of the weight of the second layer. In yet another exemplary embodiment, the filler may be added in an amount from 0 wt. % to 70 wt. % of the weight of the second layer, and more preferably the amount of filler added may be in the amount of between 0.5 wt. % to 70 wt. % of the weight of the second layer. Other exemplary embodiments may have other filler content, such as noted herein or may otherwise be needed or beneficial for a particular pipe or its uses.

For example, a user may decide that the pipe may need to have further increased thermal stability. In this case, in addition to the thermal stability of the aforementioned polymer, a glass or fiber filler may be added to the first or second layer to further increase the thermal stability of a pipe. The filler may be added to the polymeric material during the compounding or extrusion process and may be generally mixed into the polymer in a homogenous or non-homogenous manner. Talc, chemicals, metals, other mineral fillers, or other organic or inorganic fillers may also be used to increase the thermal stability (or other physical properties) either alone or in conjunction with glass or fibrous filler.

In another embodiment, the second layer may be 0.001 inches to 0.030 inches thick. More preferably, the second layer may be 0.008 inches to 0.025 inches thick, and still more preferably the second layer may be 0.012 inches to 0.018 inches thick. However, the thicknesses of the first and second layers may vary such as to account for the overall thickness of a pipe, the particular type of pipe or its uses, the particular materials, or other considerations. For example, in another embodiment having an overall thickness of 0.500 inches, the first layer may have a thickness of 0.100 to 0.480 inches, and the second layer may have a thickness of 0.020 to 0.400 inches. Additionally, the second layer may be more preferably comprised of an acrylonitrile butadiene acrylate and chlorinated polyvinyl chloride copolymer with a fibrous glass filler.

In addition to thermal stability, other fillers may be used either alone or in conjunction with other fillers to achieve other improvements in one or more properties. For example, if the pipe needs improved electrical conductivity, aluminum powder, carbon fiber, or graphite may be used. If a pipe needs improved structural strength, boron, carbon, carbon fiber, Kevlar™ or other fibrous materials may be used. For improved resistance to combustion the addition of chlorine, bromine, phosphorous, or metallic salts may be useful. Other additives and properties may be changed by the addition of other materials not mentioned herein, but generally known in the art.

Percentages of blends and combinations therein may vary from pipe to pipe as design requires (e.g., the amount of thermal stability or other material property that is needed per the end application).

In one example, polyvinyl chloride may be used as the first layer. Acrylonitrile styrene acrylate, an acrylonitrile butadiene acrylate (e.g., ABS), or polycarbonate copolymer blend may be used as a second layer. The second layer may contain glass or other filler in a homogenous mixture with the aforementioned polymer. In addition, a third layer comprising polyvinyl chloride may be added to the other side of the second layer. In one exemplary embodiment of a pipe that has an overall thickness of 0.060 inches, the first layer may be 0.001 inches to 0.050 inches thick. More preferably, in this example, the first layer may be 0.005 inches to 0.030 inches thick and still more preferably the first layer may be 0.015 inches to 0.025 inches thick. Other exemplary embodiments may have fewer or more layers, be comprised of different materials, or have different thicknesses, such as to account for a particular type of pipe or its uses, the particular materials, or other considerations.

In the above examples, polyvinyl chloride may act to smooth out a surface and form a thin decorative cap. Other exemplary embodiments may utilize other materials or layers to achieve a desirable surface (e.g., an aesthetically pleasing or durable surface).

For instance, in another exemplary embodiment, a pipe may contain a fourth layer. In an exemplary embodiment of a pipe that has an overall thickness of 0.060 inches, a fourth layer may be an ultra-violet (UV) light protection layer. The UV protective layer may be 0.001 inches to 0.010 inches thick. More preferably, the UV protective layer may be 0.003 inches to 0.008 inches thick, and still more preferably the UV protective layer may be 0.004 inches to 0.006 inches thick. Again, other exemplary embodiments may have fewer or more layers, be comprised of different materials, or have different thicknesses, such as to account for a particular type of pipe or its uses, the particular materials, or other considerations.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the invention. It is the intention, therefore, to limit the invention only as indicated by the scope of the claims.

What is claimed is:

1. A pipe consisting of:
an outermost layer of a polyvinyl chloride material; and
a second layer adjoined and positioned inwardly relative to said outermost layer, said second layer selected from the group consisting of a chlorinated polyvinyl chloride material and a polycarbonate material;
wherein neither said polyvinyl chloride material of said outermost layer nor said chlorinated polyvinyl chloride material or said polycarbonate material of said second layer are foamed;
wherein said pipe has been extruded such that said pipe has a smooth outer surface; and
wherein said pipe has improved thermal stability such that said pipe has improved resistance to a permanent property change caused solely by heat as compared to a pipe having a same shape and dimensions and comprised of only a same polyvinyl chloride material as said pipe.

2. The pipe of claim 1 wherein said pipe has a lower coefficient of linear thermal expansion as compared to a pipe having a same shape and dimensions and comprised of only a same polyvinyl chloride material as said pipe.

3. The pipe of claim 1 wherein said pipe has reduced thermal shrinkage as compared to a pipe having a same shape and dimensions and comprised of only a same polyvinyl chloride material as said pipe.

4. The pipe of claim 1 wherein said pipe has a higher heat distortion temperature as compared to a pipe having a same shape and dimensions and comprised of only a same polyvinyl chloride material as said pipe.

5. The pipe of claim 1 wherein said pipe has reduced thermal shrinkage and a higher heat distortion temperature as compared to a pipe having a same shape and dimensions and comprised of only a same polyvinyl chloride material as said pipe.

6. The pipe of claim 1 wherein said pipe has a lower coefficient of linear thermal expansion and a higher heat distortion temperature as compared to a pipe having a same shape and dimensions and comprised of only a same polyvinyl chloride material as said pipe.

7. The pipe of claim 1 wherein said pipe has a lower coefficient of linear thermal expansion and reduced thermal shrinkage as compared to a pipe having a same shape and dimensions and comprised of only a same polyvinyl chloride material as said pipe.

8. The pipe of claim 1 wherein said pipe has a lower coefficient of linear thermal expansion, reduced thermal shrinkage, and a higher heat distortion temperature as compared to a pipe having a same shape and dimensions and comprised of only a same polyvinyl chloride material as said pipe.

9. The pipe of claim 1 wherein said second layer consists of said chlorinated polyvinyl chloride material.

10. The pipe of claim 1 wherein said chlorinated polyvinyl chloride material or said polycarbonate material of said second layer comprises glass filler in an amount up to 35 wt. % of said second layer.

11. The pipe of claim 10 wherein said chlorinated polyvinyl chloride material or said polycarbonate material of said second layer comprises said glass filler in an amount between about 9 wt. % and 30 wt. % of said second layer.

12. The pipe of claim 1 wherein said second layer consists of said polycarbonate material.

13. The pipe of claim 12 wherein said polycarbonate material of said second layer comprises glass filler in an amount up to 35 wt. % of said second layer.

14. The pipe of claim 13 wherein said polycarbonate material of said second layer comprises said glass filler in an amount between about 9 wt. % and 30 wt. % of said second layer.

* * * * *